March 4, 1930.  E. F. McNUTT  1,749,598
LEAD SCREW CONTROLLING DEVICE FOR LATHES
Filed Dec. 20, 1928  4 Sheets-Sheet 1
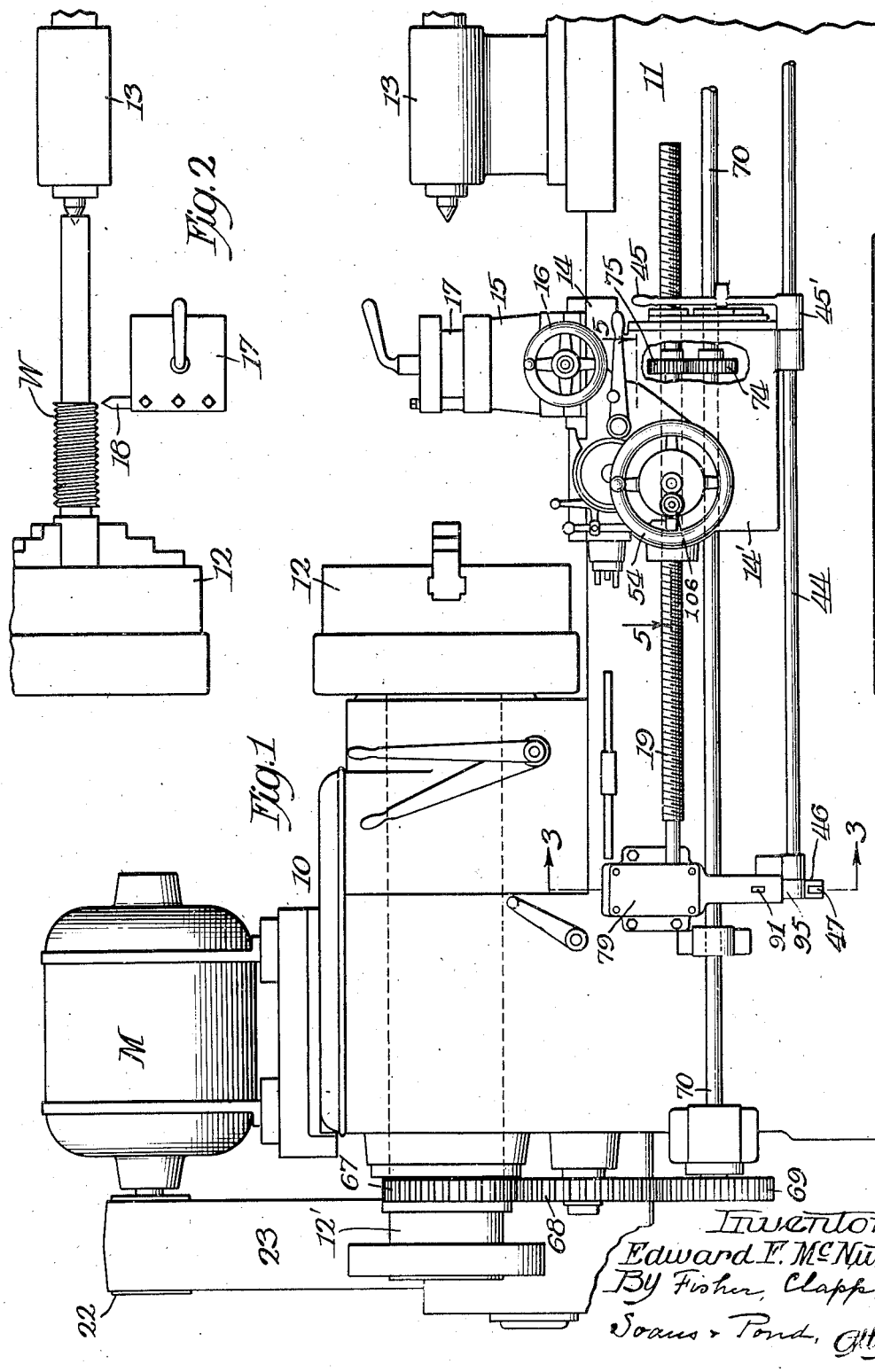

March 4, 1930.  E. F. McNUTT  1,749,598
LEAD SCREW CONTROLLING DEVICE FOR LATHES
Filed Dec. 20, 1928  4 Sheets-Sheet 2
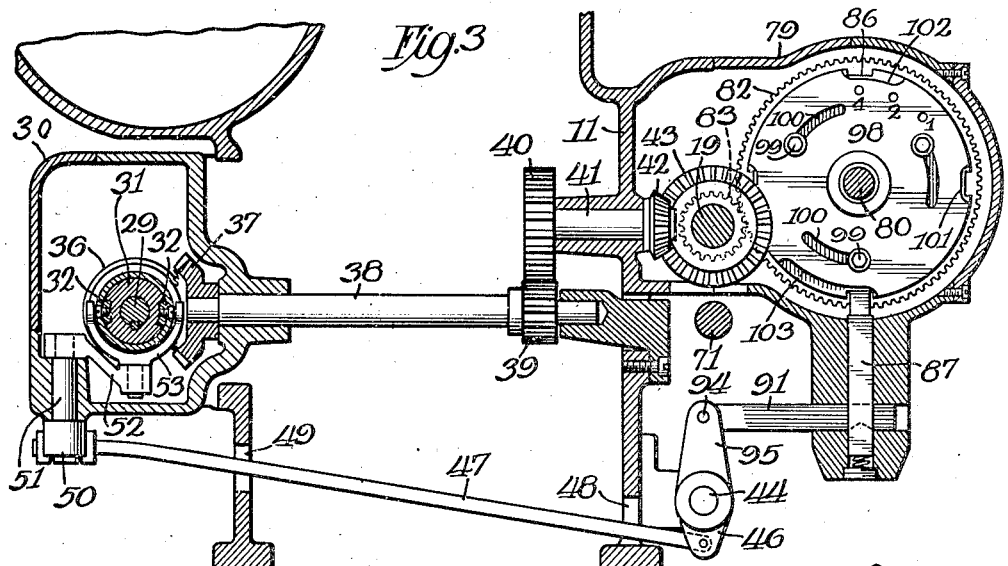
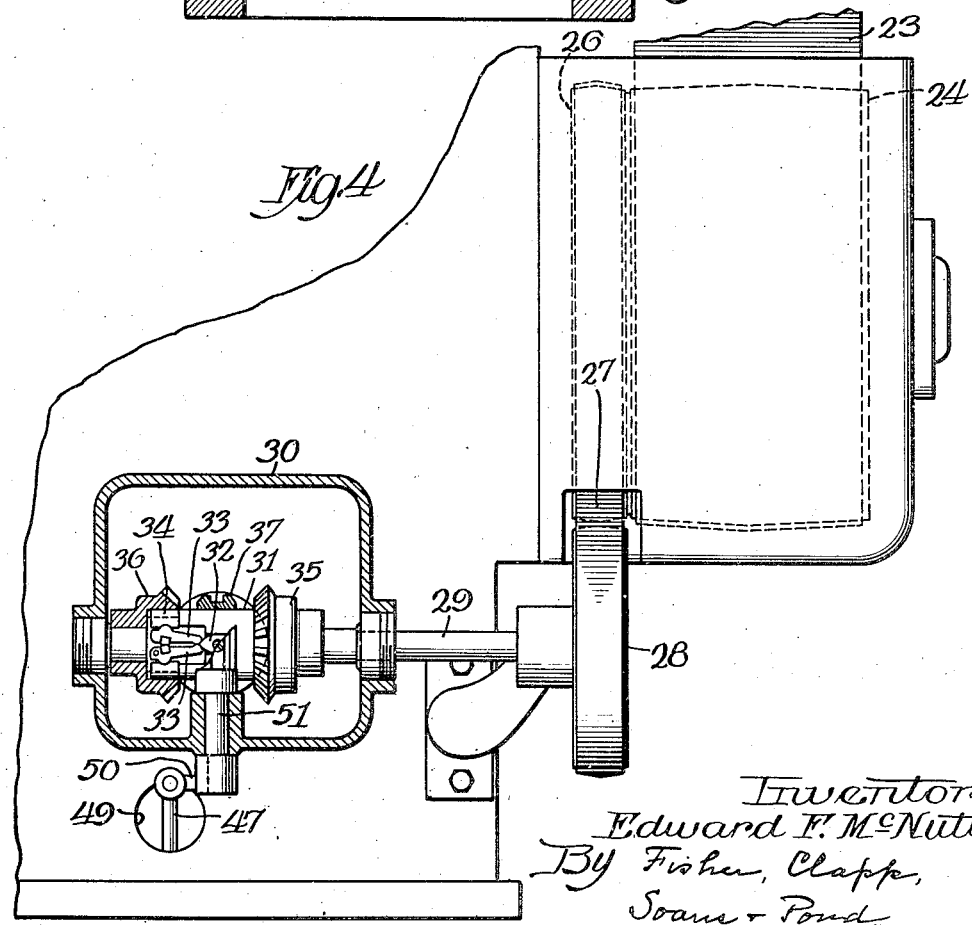
Inventor:
Edward F. McNutt,
By Fisher, Clapp,
Soans + Pond,
Attys.

March 4, 1930.  E. F. McNUTT  1,749,598
LEAD SCREW CONTROLLING DEVICE FOR LATHES
Filed Dec. 20, 1928  4 Sheets-Sheet 3

Inventor:
Edward F. McNutt,
By Fisher, Clapp, Soans & Pond, Attys.

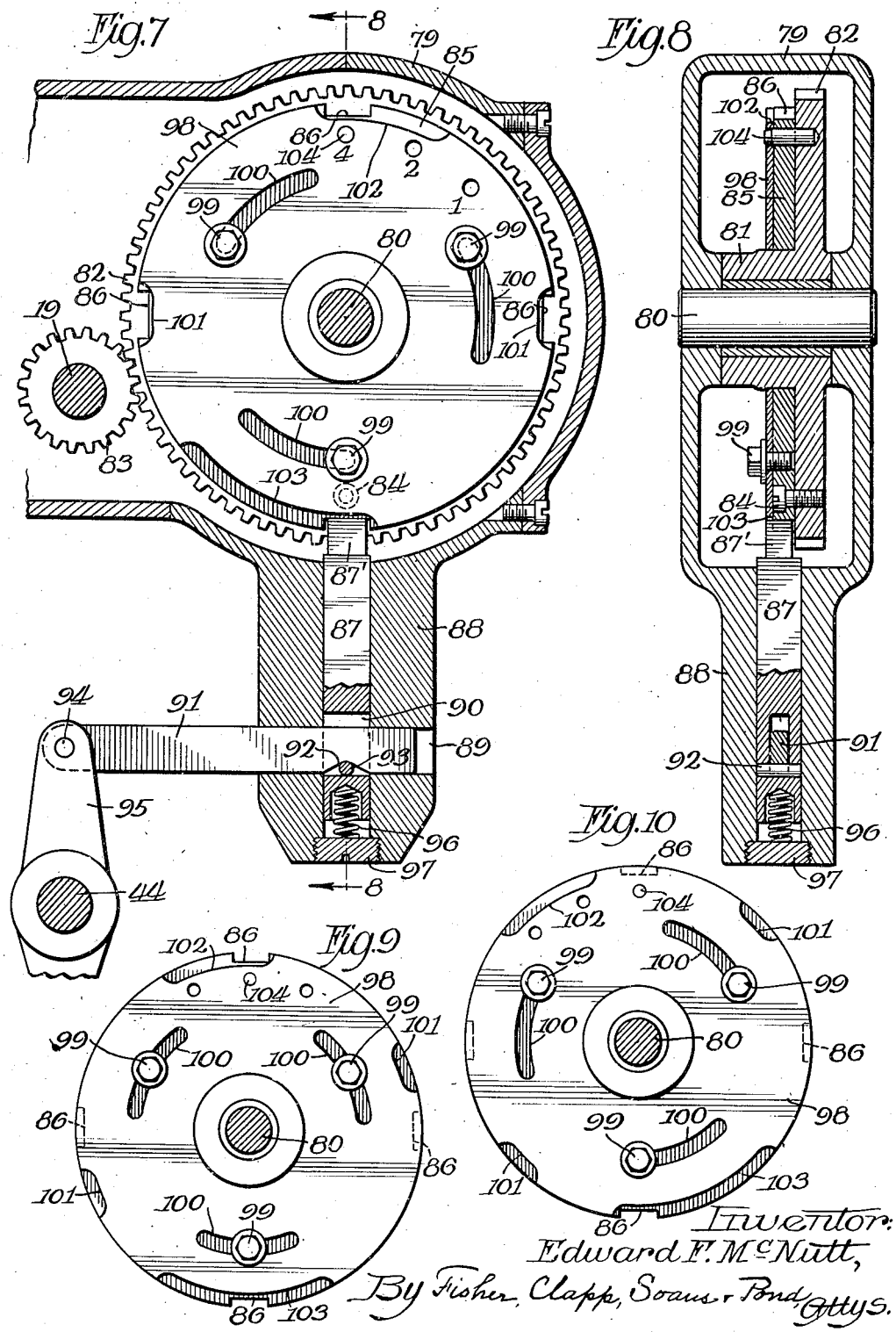

Patented Mar. 4, 1930

1,749,598

UNITED STATES PATENT OFFICE

EDWARD F. McNUTT, OF YOUNGSTOWN, OHIO, ASSIGNOR TO GISHOLT MACHINE COMPANY, OF MADISON, WISCONSIN, A CORPORATION OF WISCONSIN

LEAD-SCREW-CONTROLLING DEVICE FOR LATHES

Application filed December 20, 1928. Serial No. 327,211.

This invention relates to the general art of lathes and like machine tools which employ a lead screw for effecting the traverse movement or the feed movement, or both, of a tool carriage, and is more especially designed for use on lathes employed for cutting threads on rods, bars, shafts, and the like. Such threads are customarily cut by a cutting tool mounted on a tool post slide that is in turn mounted on a carriage slidable on and lengthwise of the lathe bed, the carriage, after the tool has made an initial cut on the work, being returned to starting position, the tool and tool slide slightly advanced to effect a deeper cut, and the carriage again advanced; these operations being repeated until a thread of the desired or predetermined depth has been cut on the work.

In such a method of cutting, it is, of course, necessary, for accurate work, that each time the point of the cutting tool is engaged with the work it shall exactly register with a previously cut groove of the thread. To do this, it is necessary to stop the return or back traverse of the carriage at an exact point with reference to the groove of the thread being cut. The eye of the operator, however skillful, cannot be relied upon for this, and the main object of the present invention has been to provide an automatic device for arresting the movement of the lead screw which effects the back traverse of the tool carriage at a point such that when the tool slide is advanced to engage the tool with the work, the point of the tool will exactly register with a previously cut groove. A further object is to provide a lead screw controlling device that may be adjustable depending upon the pitch of the thread of the lead screw, so as to insure accurate registration of the point of the cutting tool with the work in the case of machines using lead screws of varying pitches.

The nature of the present invention, its novel structural features and the manner or mode of its automatic operation will all be readily understood by persons skilled in the art as the same becomes better understood by reference to the following detailed description, taken in connection with the accompanying drawings wherein I have illustrated one simple embodiment of the invention as applied to a thread cutting lathe, and in which—

Fig. 1 is a side elevation of a lathe, broken off at one end, showing certain operating parts of my improved thread cutting lock;

Fig. 2 is a fragmentary top plan showing the chuck, tailstock, tool post and cutting tool, and a piece of work mounted in the chuck and tailstock;

Fig. 3 is an enlarged cross-section taken on the line 3—3 of Fig. 1;

Fig. 4 is a fragmentary rear elevation of the rear side of the headstock end of the lathe, showing partly in section a friction clutch through which the drive of the lead screw is transmitted and interrupted;

Fig. 7 is an enlarged view, similar to that shown at the right of Fig. 2, of the adjustable notched stop plate and the gearing therefrom to the lead screw, with the housing of the stop plate appearing in section;

Fig. 8 is a vertical section on the line 8—8 of Fig. 7;

Fig. 9 is a plan view of the adjustable stop plate illustrating a different adjustment from that shown in Fig. 7;

Fig. 10 is a view similar to Fig. 9 but illustrating another adjustment of the stop plate.

Figure 5:
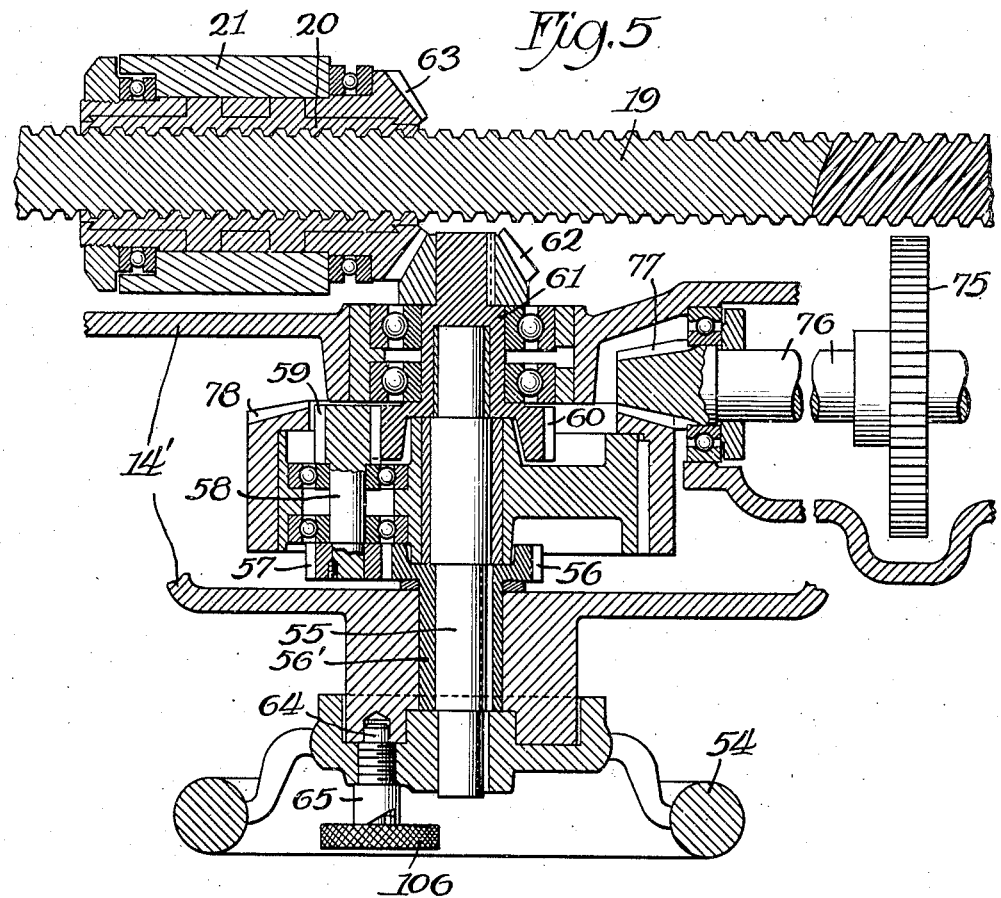
Fig. 5 is an enlarged horizontal section taken on the line 5—5 of Fig. 1 showing the hand and power feed mechanism of the tool carriage.

Referring to the drawings, 10 designates as an entirety the headstock and 11 the bed of a lathe. 12 designates the work-holding chuck fast on the inner end of the usual spindle 12' and 13 designates the tailstock slidably mounted on the ways of the bed 11 to move toward and from the chuck 12. 14 designates a tool carriage also slidably mounted on the ways of the lathe bed; 15 designates a tool slide mounted on the carriage 14 and adjustable crosswise of the lathe bed by the usual screw mechanism actuated by hand wheel 16; 17 designates the tool post mounted on the slide 15; and 18 designates a thread cutting tool adapted to operate upon the work, such as the bar W shown in Fig. 2.

The carriage 14 has the usual depending apron 14'.

Describing next the mechanism for effecting traverse movements of the tool carriage 14, 19 designates the usual lead screw journaled on and extending parallel to the bed 11, and 20 designates a sleeve nut (Fig. 5) engaged with the lead screw 19 and itself journaled in a bearing 21 on the carriage apron 14'. The lead screw 19 is power driven to effect the traverse movements of the tool carriage by any suitable mechanism, that herein shown comprising the following. M designates an electric motor mounted on the headstock 10, which, through a pulley 22 (Fig. 1) and belt 23, drives a pulley 24 (Fig. 4) on the rear of the headstock frame. Fast with pulley 24 is a pulley 26 which, through a belt 27, drives a pulley 28 fast on one end of a transmission shaft 29. As shown in Fig. 4, shaft 29 is journaled in a friction clutch housing 30 and has splined thereon a double-ended clutch slider 31 that, through expansion wedges 32 serves, when shifted in one direction or the other, to spread a pair of toggle levers 33 and, through the latter, force an expansion ring 34 keyed on slider 31 into frictional engagement with the hubs of a pair of bevel gears 35 and 36 loose on shaft 29. Referring to Fig. 3, meshing with bevel gears 35 and 36 is a bevel gear 37 keyed on a cross-shaft 38 that, through a pinion 39, gear 40, shaft 41 and bevel pinion 42 drives a bevel gear 43 keyed to the lead screw 19. Engagement of one of the bevel gears 35 and 36 with shaft 29 through the friction clutch manifestly drives the lead screw in one direction, and engagement of the other bevel gear with shaft 29 through the friction clutch manifestly drives the lead screw in the opposite direction. When the clutch slider is in intermediate or neutral position, there is no drive.

Journaled on the front side of the lathe bed is a rock shaft 44 (Fig. 1), splined on which and coupled to apron 14' is the hub 45' of a power mover lever 45, through which said shaft 44 is rocked to actuate the friction clutch slider 31 by the mechanism shown in Figs. 3 and 4. Pivoted to a short depending arm 46 fast on shaft 44 is a link rod 47 that extends through holes 48 and 49 in the front and rear sides of the lathe bed 11 and is pivotally connected at its other end to a horizontal arm 50 fast on the lower end of a short vertical shaft 51 journaled in the clutch casing 30. Fast on the upper end of shaft 51 is a downwardly inclined arm 52 (Fig. 3) in which is mounted the stem of the usual clutch slider fork 53. Through this mechanism, when the power mover lever is shifted outwardly from neutral position, relatively to the lathe bed, the bevel gear 36 will be frictionally coupled to shaft 29, and the lead screw 19 will be rotated in a direction to effect advance travel of the tool carriage toward the chuck into working position, whereupon, by manipulation of the hand wheel 16, the tool 18 is carried into cutting engagement with the work.

Figure 6:
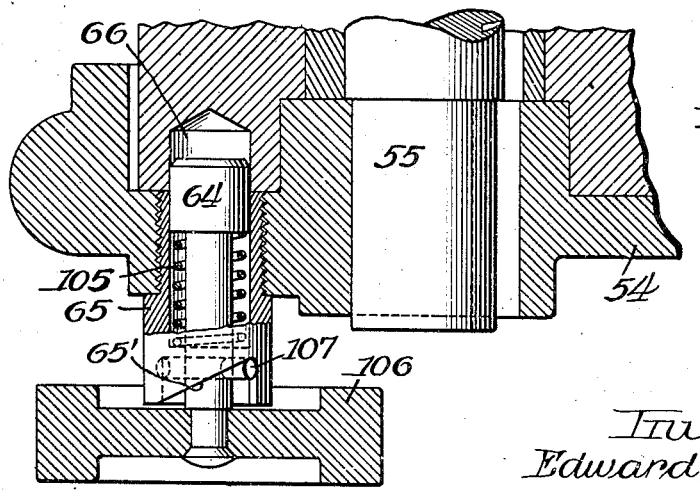
Fig. 6 is a horizontal section enlarged through a device that locks the hand feed wheel to the carriage apron when the power feed and traverse movements are engaged.

In order to effect this traverse of the tool carriage it is, of course, necessary to lock the sleeve nut 20 against rotation. This is done through the agency of the hand feed mechanism and a device by which the hand wheel of the latter is locked to the carriage apron against rotation. Briefly describing the hand feed and its lock, and referring to Figs. 5 and 6, 54 designates a hand wheel fast on the outer end of a shaft 55 journaled in the apron 14'. Splined on shaft 55 is a sleeve 56' on the inner end of which is a gear 56 that meshes with planet gears 57 fast on the outer ends of planet gear shafts 58 that are journaled in the web member of a large bevel gear 78 that is rotatable on shaft 55 and constitutes an element of the power feed mechanism, later described. On the inner ends of shaft 58 are planet gears 59 meshing with and driving a gear 60 on the inner end of a shaft 61 that is also journaled in the apron, and keyed to the inner end of shaft 61 is a bevel pinion 62 meshing with and driving a mating bevel gear 63 on one end of the sleeve nut 20. This hand feed mechanism is locked, during rapid traverse and power feed movements of the lathe by a pin 64 slidably mounted in a bushing 65 in the hub of the hand wheel 54 and normally pushed into a socket 66 in the apron 14' by a compression spring 105. On the outer end of pin 64 is a knob 106 for turning the same, and mounted in the pin 64 is a cross-pin 107 that cooperates with a cam incline 65' on the bushing 65 when the knob 106 is turned counterclockwise, to retract the pin.

The pinion 56 being held against turning by the lock last described, and the large bevel gear 78 of the planetary system being held against turning through the power feed mechanism to which it is geared, it is manifest that the bevel pinion 62 is locked stationary, so that the rotation of the lead screw 19 effects a traverse movement of the tool carriage.

A power feed mechanism is also indicated in the drawings, as follows: A train of change gears 67, 68 and 69 transmits power from spindle 12' to a feed shaft 70 journaled on the front side of the lathe bed parallel with and below the lead screw 19 and extending through the apron 14'. Slidably splined on shaft 70 is a spur gear 74 meshing with and driving a spur gear 75 fast on a short shaft 76 (Fig. 5) journaled in the apron 14'. On the inner end of shaft 76 is a bevel pinion 77 meshing with and driving the bevel gear 78, and through the planetary gears 57 and 59 and the gear 60 imparting a slow rotation to shaft 61 and bevel pinion 62, this latter driving the sleeve nut 20 through bevel gear 63, When the spindle 12' revolves, the sleeve nut 20 is power driven through the last-described mechanism to effect a uniform slow feed movement of the tool carriage; the power mover lever 45 at such time being in neutral, the lead screw 19 being held stationary, and the lead screw nut 20 being revolved on the lead screw, thus giving the desired feed for the thread to be cut, depending upon the change gear ratio (not shown) at the end of the bed.

Turning now to a description of the lead screw lock, which automatically comes into action at the end of the return traverse of the tool carriage in order to accurately register the cutting point of the tool with the previously cut thread on the work, this mechanism is shown principally in Figs. 3 and 7 to 10 inclusive. To the front wall of the lathe bed is attached a casing 79 in and between the side walls of which is mounted a shaft 80. Journaled on the shaft 80 is the hub 81 of a gear 82 which meshes with and is driven by a smaller gear 83 fast on the lead screw 19. The ratio of gears 82 and 83 as herein shown is four to one, but, of course, any desired ratio may be employed. Secured to one side of the gear 82 as by screws 84 (Fig. 8) is a round plate or disc 85, in the periphery of which are cut four notches 86 all of equal width and spaced ninety degrees apart. A greater or less number of notches equally spaced may, of course, be employed, four notches being shown to illustrate the principle of the invention. These notches are designed to interlockingly cooperate with a vertical locking pin 87 that is slidably mounted in a hollow guide 88 on the lower side of the casing 79. The guide 88 has a horizontal slot 89 near its lower end, and the pin 87 has a registering slot 90 of slightly greater width than the slot 89. Through the slots 89 and 90 extends a bar 91 formed on its lower side with an inverted V-shaped cam notch 92 that engages with a pin 93 mounted in the stop pin 87 crosswise of the lower portion of the slot 90 of the latter. One end of the bar 91 is pivoted at 94 to an upstanding arm 95 fast on the rock shaft 44. The several notches 86 in the periphery of the disc 85 are just wide enough to receive the upper reduced end 87' of the locking pin 87 when said notches register with said pin. The pin is normally urged upwardly to engage with the notches of the disc by a thrust spring 96 footed on a nut 97 that is screwed into the lower end of the guide 88.

Attached to and covering the outer face of disc 85 is a notch controlling disc 98, which is shiftable to a limited degree about its common axis with the disc 85 by means of fastening screws 99 extending through arcuate slots 100 in the disc 98 into tapped holes in the underlying disc 85. In the periphery of the adjusting disc 98 are four notches. Two opposed notches 101 are of a width to just register with and uncover two opposed notches 86 of the disc 85. A third notch 102 is approximately twice the width of a notch 86, and a fourth notch 103 is approximately three times the width of a notch 86. The disc 98 is capable of three adjustments relatively to the disc 85, and may be locked in each adjusted position by position-indicating holes 4, 2 and 1 therein engageable with the tip of a locking pin 104 (Fig. 8) set into the gear 82 and disc 85.

In the "4" position of the adjusting disc 98 illustrated in Figs. 3, 7 and 8, the locking pin 87 may engage any one of the four notches 86. In the "2" position said pin may engage either of two opposed notches 86, the other two notches being occluded by the disc 98, as shown in Fig. 9. In the "1" position illustrated in Fig. 10, all of the notches 86, except that registering with the widest notch 103, are occluded, so that the locking pin can engage said notch only.

Describing the operation, at the completion of a feed movement of the tool carriage, the tool 18 is first retracted by means of hand wheel 16, and the knob 106 is turned to permit locking pin 64 to drop into recess 66. The power mover lever 45 is then swung to one side from neutral position. The first part of this movement retracts the locking pin 87 from locking engagement with the discs 85 and 98, thus leaving the lead screw free to rotate. The final part of this movement throws in the friction clutch 31, starting the lead screw in rotation and the tool carriage thereupon makes a quick return movement toward starting position. Slightly before the tool carriage reaches its starting position relatively to the work the lever 45 is returned to neutral position, which leaves the locking pin 87 free, and the momentum of the lead screw and tool carriage is sufficient to rotate the locking disc until one of the notches thereof registers with the upper end of the locking pin, whereupon the latter snaps into the notch and instantly arrests the rotation of the lead screw and the return travel of the tool carriage. The several notches 86 bear such a relation to the thread of the lead screw and the thread being cut on the work that the stoppage of the lead screw rotation by any notch that is uncovered for engagement with the locking pin will arrest the tool carriage at a point where the cutting tool will accurately register with the thread being cut on the work.

For examples, assuming that the stop plate is geared 4 to 1 with the lead screw, and that the latter has a two-inch lead, the setting of the adjusting disc 98 at the "4" position shown in Figs. 3 and 7 will cause the cutting tool to pick up any thread of which there may be a whole number in two inches, such as 1, 1½, 2, 2½, 3, etc. threads per inch, which obviously are respectively equal to 2, 3, 4, 5, 6, etc. threads per two inches.

The setting of the adjusting disc at position "2" will cause the cutting tool to pick up any thread of which there may be a whole number in four inches, such as 1¼, 1¾, 2¼, 2¾, 3¼, etc. threads per inch, which correspond respectively to 5, 7, 9, 11, 13, etc. threads per four inches.

Setting of the adjusting disc to position "1" will cause the cutting tool to pick up any thread of which there may be a whole number in eight inches, such as 1⅛, 1⅜, 1⅝, 1⅞, 2⅛, etc. threads per inch, respectively equivalent to 9, 11, 13, 15, 17, etc. threads per eight inches.

The tool carriage having been traversed back, is arrested by bringing lever 45 to its central position at a point in the travel a little beyond the end of the work "W," registering exactly with the initial end of the thread groove on the work; the cutting tool is advanced by hand wheel 16 to take a fresh cut, and, the power mover lever being in neutral, the feed movement is effected by the slowly revolving nut, through shaft 70 and the power feed mechanism in apron 14'.

I claim—

1. In a lead screw controlling device for lathes, the combination with a lathe bed, a tool carriage mounted to reciprocate on said bed, a lead screw, a nut on said carriage cooperating with said lead screw, means, including a clutch, for driving said lead screw, and carriage feed mechanism geared to said nut, of means for arresting the rotation of said lead screw at a predetermined point comprising a notched disc rotated by said lead screw, a spring-pressed locking pin cooperating with the notches of said disc, means, including a lever, for shifting the clutch of said lead screw driving means, and means actuated by said lever serving to retract said locking pin during the clutch-engaging movement of said lever and to release said locking pin during the clutch-disengaging movement of said lever.

2. In a lead screw controlling device for lathes, the combination with a lathe bed, a tool carriage mounted to reciprocate on said bed, a lead screw, a nut on said carriage cooperating with said lead screw, means, including a clutch, for driving said lead screw, and carriage feed mechanism geared to said nut, of means for arresting the rotation of said lead screw at a predetermined point comprising a disc rotated by said lead screw and formed with a plurality of uniformly spaced peripheral notches, a locking pin disposed with one end thereof in sliding engagement with the periphery of said disc, a spring pressing said pin against the periphery of said disc, means, including a lever, for shifting the clutch of said lead screw driving means, and means actuated by said lever serving, under a single movement of said lever in one direction, to retract said locking pin just prior to the engagement of said clutch, and, during the return movement of said lever, to release said locking pin just after the disengagement of said clutch.

3. In a lead screw controlling device for lathes, the combination with a lathe bed, a tool carriage mounted to reciprocate on said bed, a lead screw, a nut on said carriage cooperating with said lead screw, means, including a clutch, for driving said lead screw, and carriage feed mechanism geared to said nut, of means for arresting the rotation of said lead screw at a predetermined point comprising a disc rotated by said lead screw and formed with a plurality of uniformly spaced peripheral notches, a slidable locking pin disposed radially of said disc with one end thereof in sliding engagement with the periphery of the latter, a thrust spring engaged with the opposite end of said locking pin, means, including a lever, for shifting the clutch of said lead screw driving means, and a cam actuated by said lever serving to retract said locking pin during the clutch-engaging movement of said lever and to release said locking pin during the clutch-disengaging movement of said lever.

4. In a lead screw controlling device for lathes, the combination with a lathe bed, a tool carriage mounted to reciprocate on said bed, a lead screw, a nut on said carriage cooperating with said lead screw, means, including a clutch, for driving said lead screw, and carriage feed mechanism geared to said nut, of means for arresting the rotation of said lead screw at a predetermined point comprising a disc geared to said lead screw to make one complete rotation during a plurality of complete rotations of said lead screw, said disc being formed with a plurality of peripheral notches spaced to correspond to a single revolution of said lead screw, a slidable locking pin disposed radially of said disc with one end thereof in sliding engagement with the periphery of the latter, a spring urging said locking pin against the periphery of said disc, means, including a lever, for shifting the clutch of said lead screw driving means, and a sliding cam actuated by said lever engaged with and serving to retract said locking pin during the clutch-engaging movement of said lever and to release said locking pin during the clutch-disengaging movement of said lever.

5. In a lead screw controlling device for lathes, the combination with a lathe bed, a tool carriage mounted to reciprocate on said bed, a lead screw, and means, including a clutch, for driving said lead screw, of a rotatable nut on said carriage cooperating with said lead screw, a carriage feed mechanism geared to said nut, means for arresting the rotation of said lead screw at a predetermined point comprising a peripherally notched disc rotated by said lead screw, a spring-pressed locking pin cooperating with the periphery of said disc, means, including a lever, for shifting the clutch of said lead screw driving means, means actuated by said lever serving to retract said locking pin during the clutch-engaging movement of said lever and to release said locking pin during the clutch-disengaging movement of said lever, and means for preventing rotation of said nut during traverse movement of said carriage by said lead screw and nut.

6. In combination with the subject-matter of claim 1, a member attached to the notched disc and adjustable on the latter to close one or more of the notches of the disc against engagement by the locking pin.

7. In combination with the subject-matter of claim 2, an adjustment disc coaxial with and attached to the notched disc and angularly adjustable on the latter, said adjustment disc having peripheral portions adapted, in one adjusted position, to expose all of the peripheral notches and in another adjusted position to close one or more of the peripheral notches against engagement by the locking pin.

8. In combination with the subject-matter of claim 2, an adjustment disc coaxial with and attached to one side of the notched disk and angularly adjustable on the latter, the periphery of said adjustment disc coinciding with the periphery of said notched disc and formed with a corresponding number of notches of varying widths, whereby rotary adjustment of said adjustment disc on said notched disc serves to expose all of the peripheral notches of the latter to said locking pin or to close one or more of said peripheral notches against engagement by the locking pin.

EDWARD F. McNUTT.